United States Patent
Donaldson

(10) Patent No.: US 11,772,542 B2
(45) Date of Patent: Oct. 3, 2023

(54) STRAP

(71) Applicant: POLYWELD PTY LTD, Campbellfield (AU)

(72) Inventor: Stuart Donaldson, Campbellfield (AU)

(73) Assignee: POLYWELD PTY LTD, Campbellfield (AU)

( * ) Notice: Subject to any disclaimer, the term of this patent is extended or adjusted under 35 U.S.C. 154(b) by 1084 days.

(21) Appl. No.: 16/307,812

(22) PCT Filed: Jun. 27, 2017

(86) PCT No.: PCT/AU2017/050653
§ 371 (c)(1),
(2) Date: Dec. 6, 2018

(87) PCT Pub. No.: WO2018/000027
PCT Pub. Date: Jan. 4, 2018

(65) Prior Publication Data
US 2019/0210508 A1  Jul. 11, 2019

(30) Foreign Application Priority Data

Jun. 30, 2016 (AU) .................................. 2016902589
Sep. 23, 2016 (AU) .................................. 2016903860

(51) Int. Cl.
*B60P 7/08* (2006.01)
*D03D 3/00* (2006.01)
(Continued)

(52) U.S. Cl.
CPC .............. *B60P 7/0823* (2013.01); *D03D 1/00* (2013.01); *D03D 1/0094* (2013.01); *D03D 3/005* (2013.01);
(Continued)

(58) Field of Classification Search
None
See application file for complete search history.

(56) References Cited

U.S. PATENT DOCUMENTS 3,145,132 A * 8/1964 Seltzer .................... D03D 15/56
2/243.1
3,148,710 A * 9/1964 Rieger ................. D03D 1/0094
139/415
(Continued)

FOREIGN PATENT DOCUMENTS

AU     2014202347 A1    11/2014
CA     1225569          8/1987
(Continued)

OTHER PUBLICATIONS

International Search Report for Application No. PCT/AU2017/050653 dated Aug. 14, 2017 (6 pages).
(Continued)

*Primary Examiner* — Arti Singh-Pandey
(74) *Attorney, Agent, or Firm* — Michael Best & Friedrich LLP

(57) ABSTRACT

In summary, the invention is directed to a strap for tensioning a vehicle side curtain, the strap comprising: a strap body having a plurality of warp yarns and a weft yarn, the weft yarn being interleaved with each of the plurality of warp yarns, wherein the warp yarns are tensioned in a substantially straight configuration; and a coating to retain the warp yarns in their straight configuration.

8 Claims, 11 Drawing Sheets

(51) Int. Cl.
*D03D 11/00* (2006.01)
*D03D 1/00* (2006.01)
*D03D 15/43* (2021.01)
*D06N 3/00* (2006.01)

(52) U.S. Cl.
CPC ............ *D03D 11/00* (2013.01); *D03D 15/43* (2021.01); *D06N 3/0006* (2013.01); *D06N 3/0034* (2013.01); *D06N 2201/0272* (2013.01); *D06N 2211/04* (2013.01); *D10B 2101/10* (2013.01); *D10B 2101/12* (2013.01); *D10B 2331/021* (2013.01); *D10B 2403/031* (2013.01)

(56) References Cited

U.S. PATENT DOCUMENTS

| | | | |
|---|---|---|---|
| 4,454,184 A | 6/1984 | Britton | |
| 5,191,777 A | 3/1993 | Schnegg | |
| 5,783,278 A * | 7/1998 | Nishimura | D03D 49/22 |
| | | | 428/102 |
| 6,455,449 B1 * | 9/2002 | Veiga | B60R 21/235 |
| | | | 442/220 |
| 2005/0009424 A1 | 1/2005 | Hazan et al. | |
| 2006/0166577 A1 * | 7/2006 | Rashed | D03D 15/573 |
| | | | 442/131 |
| 2015/0167208 A1 * | 6/2015 | Bischoff | D03D 15/587 |
| | | | 139/50 |
| 2017/0135291 A1 * | 5/2017 | Toye | A01G 13/0206 |

FOREIGN PATENT DOCUMENTS

| | | |
|---|---|---|
| EP | 0193478 A1 | 9/1986 |
| EP | 1416075 A1 | 5/2004 |
| EP | 1574609 | 7/2008 |
| EP | 1464743 | 2/2011 |
| GB | 2025789 | 1/1980 |
| WO | 2010130001 | 11/2010 |

OTHER PUBLICATIONS

International Preliminary Report on Patentability for Application No. PCT/AU2017/050653 dated Jul. 12, 2018 (57 pages).
Extended Search Report issued by the European Patent Office for related Application No. 17818733.2 dated May 22, 2019 (9 Pages).
European Patent Office Action for Related Application No. 17818733.2 dated Feb. 7, 2023 (8 pages).

* cited by examiner

STRAP

TECHNICAL FIELD

The present invention relates to a strap. The straps is particularly, although by no means exclusively, suitable for use in a vehicle side curtain. The present invention also relates to a method of making a strap that is suitable for use in a vehicle side curtain and a vehicle side curtain that comprises the strap.

BACKGROUND

Trailers are common means of transporting goods from point to point and trailers with side-curtains offer time savings and access advantages for loading and unloading of cargo therefrom.

A side-curtain trailer will typically comprise a load floor and an upper structure or framework of some form. The framework can have a single opening, typically at the rear of the trailer and can further comprise at least one side opening for additional cargo access. The upper portion of the framework will support the weight of the side-curtain and the buckles, hooks, straps and rotating tensioner can be used to tension the side-curtain. Generally cargo is packed into boxes or palletised to correspond to a given delivery. Accordingly, the load floor is typically flat for ease of lading.

During transportation of cargo it is not uncommon to experience "load shift" where palettes or items within the trailer shift about in response to sideways or lateral forces and changes in momentum, of the truck is motion. Load shift is dangerous because it changes the handling characteristic of the trailer. The shifting of the load can alter the stability of the trailer and, depending on the severity of the load shift, can cause the trailer, and any attached vehicles, to overturn thereby posing a risk of property damage and a threat of serious injury or death.

The side-curtains of the trailer are intended to close a portion of the trailer and to provide a firm yet flexible side closure to the trailer. The curtains are formed from a flexible, durable material to allow them to be drawn across an open load bay of a trailer and thereby close access to cargo within the trailer. However, the curtain must also exhibit sufficient strength to limit the cargo from excessively deforming or bulging the sides of the curtain when experiencing load shift.

This issue is sometimes addressed by including load coating straps, chains, ropes, cables and other restraints or providing metal gates or barriers at intervals along the open side of the trailer. However, an operator is then forced to remove not only the curtain but the gate/s in order to gain access to the cargo of the trailer. This can diminish the time savings provided by using a side-curtain trailer.

Curtains have been designed to be manufactured from heavy duty material that can inherently provide the strength required to compensate for a lack of additional gate or barrier structures, however, the strength of the curtain required becomes inflexible and does not easily draw open or closed, leaving an operator to wrestle with the curtain.

The term trailer, as used herein is understood to refer to vehicles including trucks, trailers, truck trailers, wagons, containers and other forms of open sided vehicles that are adapted to have a curtain to close the open side.

It would be desirable to address or at least lessen some of the above known issues presently associated with the use of side-curtain trailers.

SUMMARY

The invention is broadly directed to a strap for tensioning a vehicle side curtain, the strap comprising: a strap body having a plurality of warp yarns and a weft yarn, the weft yarn being interleaved with each of the plurality of warp yarns, wherein the warp yarns are in a substantially straight configuration; and a coating to retain the warp yarns in their substantially straight configuration.

A linear mass density of the plurality of warp yarns may be greater than a linear mass density of the weft yarn.

The coating may bind the weft yarn and the warp yarns together within the body of the strap.

The coating may bind the weft yarn to each of the plurality of warp yarns, at each location where the warp yarns and weft yarn intersect each other.

The plurality of warp yarns may be arranged adjacent to one another across a width of the strap.

The plurality of warp yarns may be arranged in longitudinal alignment to one another to define a planar strap.

The strength of each warp yarn may be substantially greater that the strength of the weft yarn.

The diameter of each warp yarn may be substantially greater that the diameter of the weft yarn.

The weight of each warp yarn may be substantially greater that the weight of the weft yarn.

The ratio of the linear mass density of the weft yarn to the linear mass density of the warp yarns may be about 25:1.

The ratio of the linear mass density of the weft yarn to the linear mass density of the warp yarns may be about 20:1.

The weft yarn may be interleaved with each of the warp yarns in a predetermined winding sequence. The winding sequence may be repeated along the body of the strap. The winding sequence of the weft yarn may shift to start from an adjacent warp yarn each time the winding sequence is repeated. The winding sequence of the weft yarn may shift to start from an adjacent warp yarn every second time the winding sequence is repeated. The winding sequence of the weft yarn may be repeated twice before shifting to start a subsequent winding sequence from an adjacent warp yarn. The winding sequence may be repeated between 2 and 5 times for every centimetre length of the strap. The winding sequence may be repeated 3 times for every centimetre length of the strap.

In some embodiments, the strap may comprise additional weft yarns, interleaved with the plurality of warp yarns to form an outer weft layer around the plurality of warp yarns. The additional weft yarns may be interleaved with each other to from a knitted weft layer around the plurality of warp yarns.

Each warp yarn may have a linear mass density of between 4000 to 15000 Decitex. Each warp yarn may have a linear mass density of between 6000 to 13000 Decitex.

Each weft yarn may have a linear mass density of between 300 to 600 Decitex. Each weft yarn may have a linear mass density of between 400 to 550 Decitex.

In some embodiments, each warp yarn may have a maximum elongation at break of less than 5%. Each warp yarn may have a maximum elongation at break of less than 3.5%. In some embodiments, the strap may have a maximum elongation at break of less than 3%.

The plurality of warp yarns may be oriented in a primary loading direction of the strap. The strap body may be unidirectional.

In some embodiments, each warp yarn may comprise between 500-8000 individual fibres. Each warp yarn may comprise between 2000-4000 individual fibres. Each weft yarn may comprise between 50-600 individual fibres. Each weft yarn may comprise between 200-500 individual fibres. In some embodiments, the individual fibres of each warp yarn may be twisted along the length of the warp yarn.

The warp yarns may be made of any one of the following materials: aramid fibres, para-linked aramid fibres, carbon fibres, and basalt fibres. The warp yarns may be made of at least one of Technora™, Twaron™, and Kevlar™.

In some embodiments of the strap the coating may be a plastic. The coating may be a thermoplastic. The coating may be polyvinyl chloride.

In some embodiments the warp yarns may be impregnated with a plasticiser, and the plasticiser is heated to form the coating.

In some embodiments, the strap may further comprise a loop at one end thereof, the loop formed by welding the coating of the strap in a first region to the coating of the strap in a second region.

The invention further provides a strap for tensioning a vehicle side curtain, the strap comprising: a strap body having a plurality of warp yarns and a weft yarn, the weft yarn being interleaved with each of the plurality of warp yarns; and a coating, wherein a linear mass density of the plurality of warp yarns is greater than a linear mass density of the weft yarn, such that the warp yarns are retained within the strap in a substantially uncrimped configuration.

In a further embodiment, the invention provides a vehicle side curtain for a vehicle, comprising: a sheet for location adjacent a roof of the vehicle, the sheet having upper and lower portions; and a plurality of straps that extend between the upper and lower portions of the sheet, each of the straps at least partially restrained to the sheet, at least one of the straps comprising: a strap body having a plurality of warp yarns and a weft yarn, the weft yarn being interleaved with each of the plurality of warp yarns, wherein the warp yarns are in a substantially straight configuration; and a coating to retain the warp yarns in their substantially straight configuration.

The straps may be restrained to the sheet by welding. The straps may be restrained to the sheet by bonding. The straps may be restrained to the sheet by stitching.

In a still further embodiment, the invention provides a method of manufacturing a strap for tensioning a vehicle side curtain, the method comprising the steps of: (a) interleaving a weft yarn with a plurality of warp yarns to form a strap body; (b) bringing the warp yarns into a substantially straight configuration; and (c) using a coating to retain the warp yarns in their substantially straight configuration.

Bringing the warp yarns into a substantially straight configuration may comprise applying a tension to the strap body.

The coating may be settable material and using the coating comprises setting the settable material.

Using the coating may comprise drawing the strap body through a bath of the curable material. Using the coating may comprise impregnating the warp yarns with the settable material, preferably prior to interleaving the warp yarns with the weft yarn.

Setting the settable material may comprise heating the settable material to more than 200° Celsius. Setting the settable material may comprise heating the settable material to more than 240° Celsius. The settable material may comprise a liquid plasticiser. The settable material may comprise polyvinyl chloride.

BRIEF DESCRIPTION OF THE DRAWINGS

In order that the invention may be more easily understood, an embodiment will now be described, by way of example only, with reference to the accompanying drawings, in which.

Embodiments of the invention will now be described in further detail below, wherein like reference numerals indicate similar parts throughout the several embodiments.

DETAILED DESCRIPTION

Figure 1:
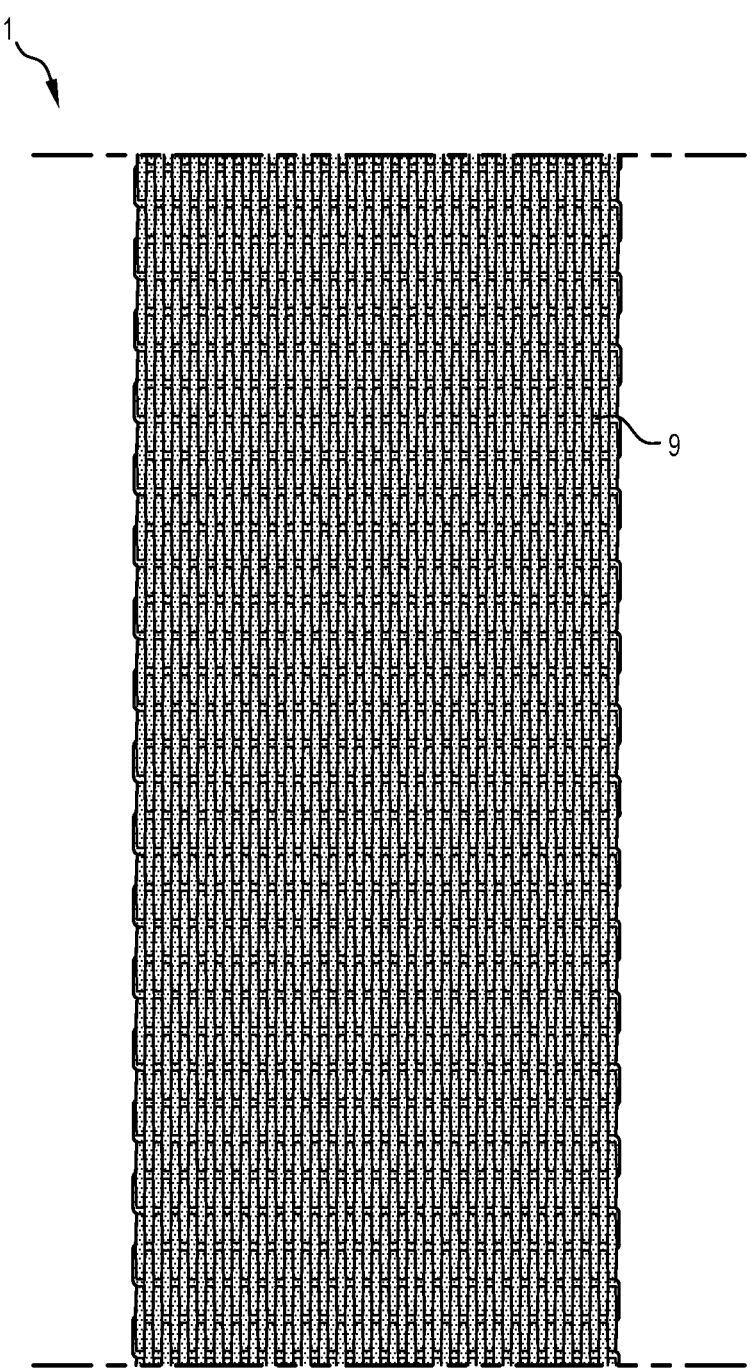
FIG. 1 is a top view of a strap in accordance with one embodiment of the invention, illustrating an outer coating layer.

The term "fibre" is understood herein to refer to a single filament of a base material, where the properties of the fibre are the same as those of the base material.

The term "yarn" is understood herein to refer to a collection of fibres bundled together. The material properties of the yarn are dependent on how the yarn is formed as well as the properties of the individual fibres therein.

The term "thread" as understood herein refers to a combination of yarns, often plied or wound together to form a single strand for sewing or weaving with.

In a first embodiment, the invention provides a strap 1 for tensioning a vehicle side curtain 10, the strap 1 comprising: a strap body 7 having a plurality of warp yarns 5 and a weft yarn 3, the weft yarn 3 being interleaved with each of the plurality of warp yarns 5, wherein the warp yarns 5 are in a substantially straight configuration; and a coating 9 to retain the warp yarns 5 in their substantially straight configuration.

For ease of reference the winding sequences of the weft yarn 3 about the plurality of warp yarns 5, are described in reference to traditional weaving patterns, such as plain, sateen, twill etc. However, these "weaving terms" are to be distinguished from the various embodiments of the invention described herein, which use similar winding sequences between the weft yarn 3 and the warp yarns 5 to retain the warp yarns 5 within the strap body 7 in a substantially uncrimped configuration. The relative mass density of the warps yarns 5 of the strap 1 of the invention are significantly higher than the relative mass density of the weft yarns 3, such that when the warp yarns 5 and weft yarns 3 interleave, the warp yarns 5 are not bend as would be the warp yarns of a conventional woven fabric. Instead the warp yarns 5 remain substantially straight within the body 7 of the strap 1.

A first embodiment of the invention will now be described in detail in reference to FIGS. 1 and 1A. The strap 1 of FIG. 1 is formed from a plurality of warp yarns 5 and a weft yarn 3 using a plain-weave pattern. In some embodiments the weft yarn 3 may be a single, continuous weft yarn 3 that passes back and forth across the warp yarns, effectively looping across a width of the strap 1. In some embodiments the weft yarn 3 may comprise a plurality of weft yarns 3. In some embodiments the weft is used double pick ie. the weft yarn passes back and forth (twice) across the warp yarns in between movement of the heddles of the loom. This provides a double thickness of weft (603a, 603b) as illustrated in FIG. 10B. A locking thread at the edges of the strap body 7 hold the double weft yarns in place to help maintain stability of the strap body 7.

Plain weave is a simplistic weave pattern where the weft 3 yarn consecutively passes under and over each consecutive warp yarn 5 to provide a symmetrical pattern. This results in a strap body 7 having the technical face (or front face) of the strap 1 being the same as the technical back (back face) of the strap 1. FIG. 1B illustrates this winding sequence in a schematic layout.

Figure 1A:
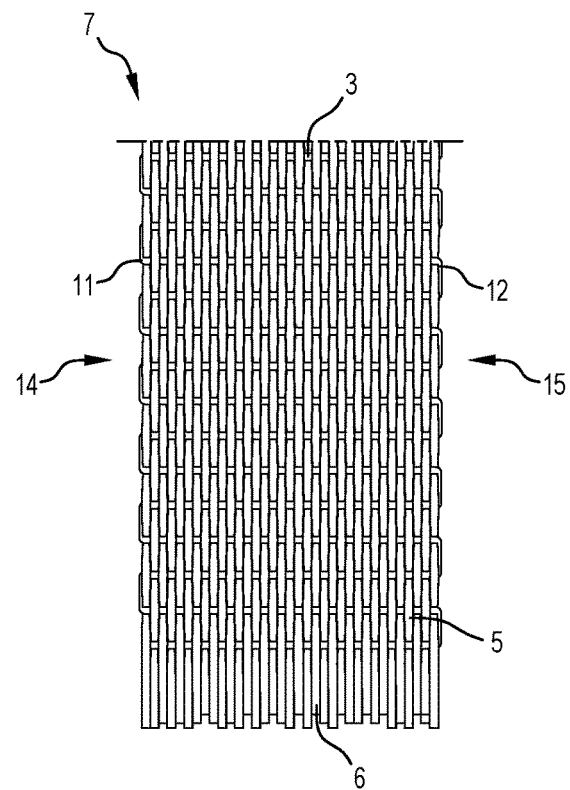
FIG. 1A is a top view of a body of the strap of FIG. 1, prior to coating, to illustrate the winding sequence of a weft yarn around the warp yarns.
Figure 1B:
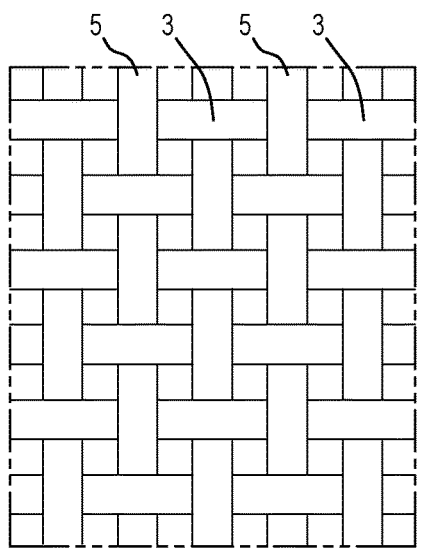
FIG. 1B is a schematic lay out of the warps and wefts of a plain weave pattern.

In the strap 1 of FIG. 1A, the warp yarns 5 and weft yarn 3 are of distinctly dissimilar size, weight and linear mass density such that the weft yarn 3 undulates under and over as it is wound sequentially around the warp yarns 5, the warp yarns 5 themselves remaining un bent, or uncrimped, and substantially straight.

FIG. 1A illustrates the strap body 7, prior to the application or setting of the coating. The individual warp yarns 5 comprise a plurality of individual, straight, elongate filaments or fibres 6. Each warp yarn 5 may be formed of a bundle of between 500 and 5000 individual fibres 6.

The weft yarn 3 can also comprise a plurality of individual filaments or fibres 8. Each weft yarn 5 may be formed of a bundle of between 300 and 500 individual fibres 8.

The fibres 6 of each warp yarn 5 are straight within the bundle, that is to say they are substantially straight and not twisted or wound around each other within the bundle. Accordingly, the fibres 6 are not twisted within the warp yarns 5, such that pulling on the individual fibres 6 would allow them to slide out from the weft 3. Accordingly, the fibres 6 are retained straight within a casing formed from the weft yarn 3 and they are they do not bend or undulate through the body 7.

The strap body 7 of this embodiment comprises 24 adjacent warp yarns 5. However, it is contemplated that fewer than 24 or more than 24 warp yarns 5 can be used to form a finished strap 1 of any desired width. The strap 1 may be referred to as having 10 e.p.i (or ends per inch), where e.p.i references the number of warp ends per inch of weaving width.

In the strap 1 of FIG. 1A the weft yarn 3 is a double pick (or double shot). That is to say, the continuous weft yarn 3 is passed over the plurality of warp yarns 5 in the same winding sequence twice (in and out of a loom on the same shot), before reversing the winding sequence. This effectively doubles the number of weft yarn 3 passes within the body 7 of the strap 1. To prevent the winding sequence from coming apart or unravelling, locking threads 11 can be used at each edge of the body 7.

Figure 1C:
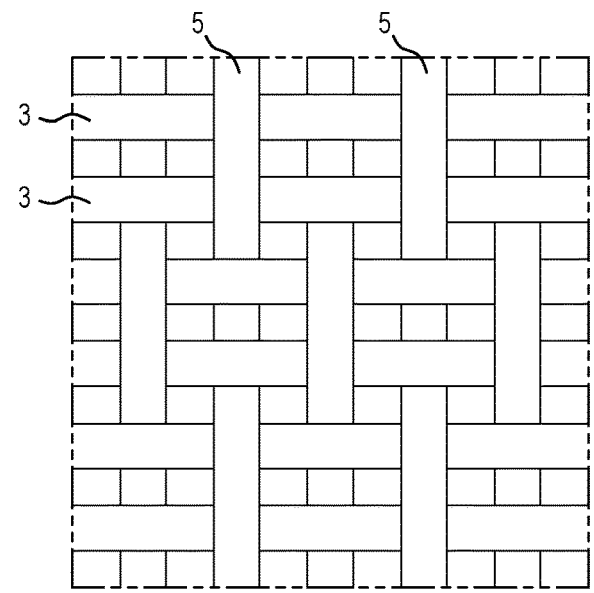
FIG. 1C is a schematic lay out of the warps and wefts of the body of FIG. 1A, illustrating double shots of weft across the warp yarns.

FIG. 1C is a schematic illustration of the above described winding sequence where the dark weft yarn 3 travels double pick across the white, warp yarns 5.

Opposing edges 14, 15 of the body 7, can have respective locking threads 11, 12, as illustrated in FIG. 1A. After every other pass of the weft yarn 3 over the plurality of warp yarns 5, the weft yarn 3 travels around the locking thread 11 or 12 and then passes over the plurality of warp yarns 5 in an opposing sequence. As such the locking threads 11, 12 at the edges 14, 15 of the strap body 7 prevent the weft yarn 3 from moving out of sequence (or unravelling).

The body 7 of FIG. 1A is formed using a loom. Preferably a narrow loom or a finger loom, as the length of the finished strap is significantly greater than the width of the finished strap.

The warp yarns 5 may be formed of a very-high strength material, for example a para-linked aramid fibre such as Kevlar™, Twaron™, Technora™. In a particularly preferred embodiment, the warp yarns 5 are formed of Twaron™. These yarns have a maximum elongation at break of between 2.4% to 4.6% depending on the mass linear density of the selected fibre and grade of Twaron™ fibre used. Accordingly, the warp yarns 5 provide a strong and durable body 7 for the strap 1.

For example Twaron™ has a tensile strength two to three times higher than that of high strength polyester and five times higher than that of steel (per weight basis).

A benefit of using aramid fibres to form the body 7 of the strap 1 is that this material may retain about half of its room temperature tensile strength and modulus at temperatures up to 250° Celcius. This provides a large working temperature range for the strap 1.

The strap 1 of FIG. 1 can be made from a variety of different material combinations. The warp yarns are selected from a variety of low elongation materials. An example of one such material combination uses the following specifications:

Weft yarn: 1 End (500 fibres)
    550×1 D/tex Twaron™ (2040 grade)
Warp yarns: 24 Ends (4000 fibres in each)
    6440×1 D/tex Twaron™ (2200 grade)
Locking thread: 1 End
    550 D/tex Twaron™

In this embodiment the weft yarn 3 has a linear mass density eleven times lower than the linear mass density of the warp yarns 5. This difference in properties is partly attributed to that fact that each of the plurality of warp yarns 5 comprises 4000 individual fibres 6 compared to only 500 individual fibres 8 within the weft yarn 3. As such the differential in strength to weight ratio between the warp yarns 5 and the weft yarns 3 is such that the warp yarn is not deviated by the weft yarn being interleaved therewith. All of the undulations under and over the warp yarns is accommodated in the weft yarn to retain the plurality of warp yarns as straight and uncrimped as possible within the body of the strap 1.

Twaron™ 2200 Grade

Twaron™ is available in the following yarns, where the different mass densities of yarn are comprised of a varying number of fibres.

| | Linear Density D/tex | | | | | |
|---|---|---|---|---|---|---|
| | 4830 | 6440 | 8050 | 9660 | 12880 | 16100 |
| No. of fibres | 3000 | 4000 | 6000 | 6000 | 8000 | 10000 |

The differing mass densities of Twaron™ yarns exhibit the following mechanical properties:

| | | | | | | |
|---|---|---|---|---|---|---|
| Linear density D/tex | 5310 | 6840 | 8550 | 10260 | 13585 | 17000 |
| Linear density DNF* | 4890 | 6510 | 8150 | 9765 | 13025 | 16300 |
| Breaking strength N | 1060 | 1400 | 1750 | 2110 | 2750 | 3285 |
| Elongation at break % | 2.7 | 2.75 | .75 | .8 | 2.4 | 2.3 |
| Modulus GPa | 112 | 111 | 111 | 110 | 120 | 120 |

*DNF—dry no finish

Depending on the desired usage of the strap 1 and the loads to be resisted, the above variants of Twaron™ yarn can be selected to provide a strap 1 with preselected properties.

Linear Mass Density

Linear mass density is a measure of the amount of mass per unit length. As such the units of linear mass density are expressed in kilograms per metre (kg/m). When denoting a fibre or yarn, the term D/tex (or dtex or decitex) as used herein refers to the unit of measurement for the linear mass density of the fibre or yarn.

The base unit "tex" is defined as the mass in grammes of 1000 metres of a yarn. A given yarn may be referred to in terms of "D/tex" which is the mass in grammes of 10,000 metres of the yarn (D/tex being an abbreviation for decitex). For example: 550 decitex denotes that 10,000 metres of the yarn will weigh 550 grammes (g).

The weft yarn 3 in the above specification has a linear mass density of 550 decitex. This is to be contrasted with the warp yarns 5 which have a linear mass density of 6440 decitex; and therefore have a significantly greater linear mass density than that of the weft yarn 3.

According to the above definition, the diameter (physical size) of a fibre of a warp yarn 5 can be the same as a fibre of a weft yarn 8. However, if the D/tex of the two yarns is different, then the linear density of the two yarns will be different, such that the weft yarn (@550 D/tex) is less dense than the warp yarn (@6440 D/tex) and subsequently, more flexible and less rigid.

In the above specification, the weft yarn 3 comprises about 500 individual fibres 8, in contrast to the warp yarns 5 which each comprise about 4000 fibres 6. As such there is a dramatically different mechanical performance between the warp yarns 5 and the weft yarn 3. This mechanical performance is based on a number of mechanical properties that can be combined, specifically the warp yarns may have: (a) a higher mass density; (b) a higher grade of base material (Twaron™ 2200); (c) a greater number of individual fibres per yarn; and (d) a straight, uncrimped configuration. Each of the above features (a) to (d) can be employed alone, or in combination, to differentiate the warp yarns 5 from the weft yarn 3 of the strap 1.

The coating is heated or otherwise set to form an exterior coating 9. The coating material may be a plastic material or plastisol compound. The plastic material is a thermoplastic ie. the plastic will soften on heating and harden on cooling, repeatedly, for example PVC.

The coating 9 effectively sets the warp yarns 5 and weft yarn 3 within the body 7 of the strap 1. The coating 9 holds the warp yarns 5 and weft yarn 3 in a predetermined configuration. This use of the coating 9 allows the amount of weft yarn 3 used to form the body 7 to be reduced which may improve material utilisation within the strap 1.

Before the body 7 is coated the body 7 is of a very loose configuration. While the weft yarn 3 holds the warp yarns 5 is place, the warp yarns 5 can still move around within the body 7 of the strap. When the plastic coating 9 is applied and set, the warp yarns 5 are locked into position relative to the weft yarn 3 and the configuration of the strap 1 is locked in place. In this manner the coating stabilises the body 7 of the strap 1, allowing the strap 1 to be handled, transported and attached to curtain material to create a trailer side curtain. The coating 9 holds in place each intersection between the weft yarn 3 and each of the plurality of warp yarns 5 so as to load the strap 1 evenly and not distort the configuration of the body 7.

The coating can be applied to the strap 1 in a liquid form or alternatively as a powder that is impregnated into the fibres 6 of the warp yarns 5. Once the coating is applied to the body 7, the coating is set by exposing the strap 1 to heat at temperatures of about 200-240° C. for about 10 seconds.

The strap 1 of the invention described herein is a unidirectional strap. As such, the majority of fibres within the strap 1 are aligned in a single direction and provide good load bearing properties in a single or primary load bearing direction. The properties of a unidirectional strap may be very different in a non-loaded direction eg. across the width of the strap 1 or diagonally across the face of the strap 1. Where the unidirectional strap 1 is intended to bear load in a single primary direction, there may be opportunities for cost savings. Specifically, cost saving may be realised in tailoring the properties of the strap 1 in a first "working" direction while reducing and possibly saving mass in other "non-working" directions. Due to the significant difference in linear mass density between the weft 3 and warp yarns 5, the strap 1 may be referred to as a non-crimped strap. This term is understood and used herein, to refer to a strap where the warps and wefts are not woven into the strap but still constitute a warp and weft construction eg. where bundles of fibres 6 are effectively stitched together by the weft 3 such that the high strength fibres 6 are retained in a straight and un bent or un-crimped orientation. This provides advantages as an un-crimped or straight fibre provides the highest mechanical properties for a given material as there are no bends or folds to act as localised stress raisers within the material.

A typical woven fabric will exhibit crimping in both the warp and weft yarns; however, where one of the warp or weft is significantly stronger or heavier by weight than the other a situation arises where the strongest yarn remains un-crimped and the lighter yarn is bent and twisted around the stronger yarns. In this configuration the heavier yarn remains straight and in at least some embodiments is oriented in a primary loading direction of the strap. The lighter yarn in at least some embodiments is of such a weight that its purpose is merely to hold the heavier yarn in a usable configuration while itself bearing minimal load.

The term "crimping" is also used to refer to a localised area of damage in a fibre. Crimping occurs where two equally strong fibres are intertwined together and as pressure is applied to the warp yarns by the weft yarn, and vice versa, the individual fibres bear against one another and cause damage to each other eg. rubbing or fracture wearing. As the crimping occurs in localised areas of the yarns it may increase the propensity for the yarn to break thereby lowering the overall strength of the strap as compared to the strength of the constituent yarns. As the aramid fibres of the warp yarns 6 of the strap 1 are straight, and the weft yarn 3 is of a significantly lower linear mass density, the opportunity for crimping in at least some embodiments is reduced allowing the strap 1 to achieve a high level of overall strength and/or toughness.

An uncrimped construction to strap 1 in at least some embodiments further reduces the amount of elongation that the strap 1 will exhibit when loaded. As the warp yarns 5 are aligned in the primary loading direction of the strap 1, these yarns 5 begin to load in tension once the load is applied. The warp yarn 5 will not begin to internally tension until the yarn 5 is truly aligned with the direction from which the load is being applied. By retaining the warp yarns 5 within the body 7 in a substantially straight and uncrimped orientation, the strap 1 begins to bear against applied loads at a rate faster than that of a conventionally woven strap.

Further benefits may be achieved in respect of more even loading through a strap where the warp yarns are not crimped or woven in the primary loading direction. A traditional woven construction can produce an uneven straightening of the woven fibres when a load is applied in a single direction. In this scenario the shortest fibre will be loaded sooner than the longer, surrounding fibres. As such the shortest fibre may be overloaded. This can lead to an uneven loading across the strap and even to localised tearing which may then dynamically load other areas of the strap resulting in an unzipping style failure across the strap.

The strap 1 of the invention is produced on a loom, using highly dissimilar warp yarns 5 to those of the weft yarn 3.

The warp yarns 5 may be of a significantly stronger material to those of the weft yarn 3 eg. aramid fibres have an Ultimate Tensile Strength (UTS) around 2500 MPa.

The warp yarns 5 may be of a significantly denser material to those of the weft yarn 3.

The warp yarns 5 may be of a significantly less flexible material to those of the weft yarn 3.

The warp yarns 5 may be of a significantly higher yield material to those of the weft yarn 3.

The warp yarns 5 may be of a significantly larger diameter to those of the weft yarn 3.

The warp yarns 5 may comprise a significantly larger number of individual fibres than the number of fibres in the weft yarn 3.

The finished strap 1 may exhibit a breaking strain of at least 2400 kg. This equates to a breaking strain of about 23.52 kN, as a minimum requirement for the strap 1.

The finished strap 1 exhibits minimal elongation under load. A number of straps 1 using the above material specification were tested to braking point and recorded as having an average elongation at break of less than 3%.

With all of the warp yarns 5 aligned to take load in a primary load direction, about 90% of the loading of the strap 1 is reacted by the warp yarns 5, while a mere 10% of the load on the strap 1 is taken by the weft yarn 3 in a non-primary direction.

The Draft

Figure 2:
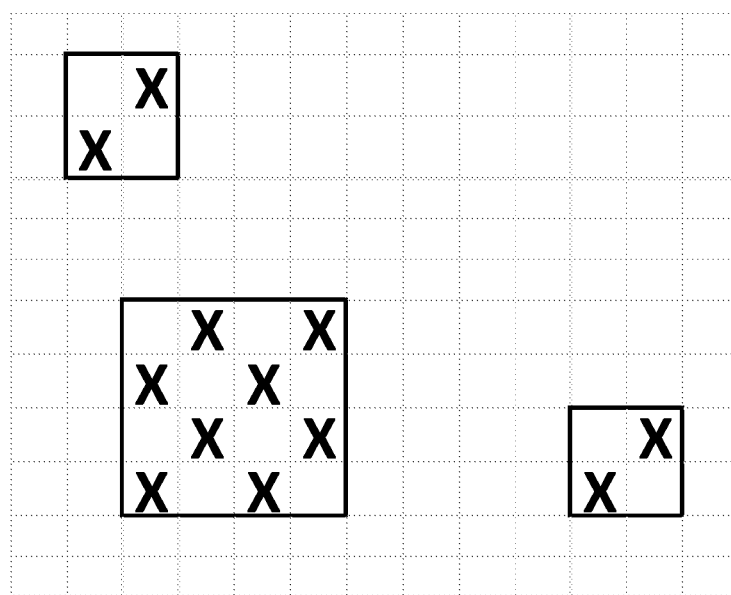
FIG. 2 is weaving draft for the strap body of FIG. 1A, showing (a) a point paper design; (b) a drawing plan (or threading plan); and (c) a lifting plan.

To set-up the loom the operator will require a draft or map for the strap that is to be created. FIG. 2 illustrates a draft for forming the body 7 of FIG. 1A. The draft comprises three elements: a point paper design FIG. 2 (a); a drawing (or threading) plan FIG. 2(b); and a lifting (or treadling) plan FIG. 2(c).

The drawing or threading plan informs the operator of the order in which heddles of the loom are to be threaded with the warp yarns 5.

The term "heddle" as recited herein is understood to refer to a series of devices within a harness of the loom, each having an aperture (or eye) through which ends of each warp yarn 5 is threaded.

The second part of the draft is the lifting plan, which informs the operator of the order in which the heddles of the loom are to be raised and lowered, in use. As each heddle is raised, the associated warp yarns are also raised, to enable a shuttle to pass back and forth across the warp yarns 5 laying down a shot (or pick) of weft yarn 3. A strap may be referred to as having 10 p.p.i (or picks per inch), where p.p.i refers to the number of weft shots in an inch of weaving length.

The final part of the draft is the point paper design which informs the operator of the pattern to be achieved for the body 7.

The point paper design illustrates a grid, shown in FIG. 2(a), where the horizontal spaces represent weft yarns and the vertical spaces warp yarns. Accordingly, each square on the point paper is an intersection point between a pair of warp and weft yarns. A mark in the square of the grid represents that the warp thread is on top of the pattern, and a blank square indicates that the weft is on top of the pattern. An "X" is typically used to mark the squares of the grid.

Second Embodiment

Figure 3:
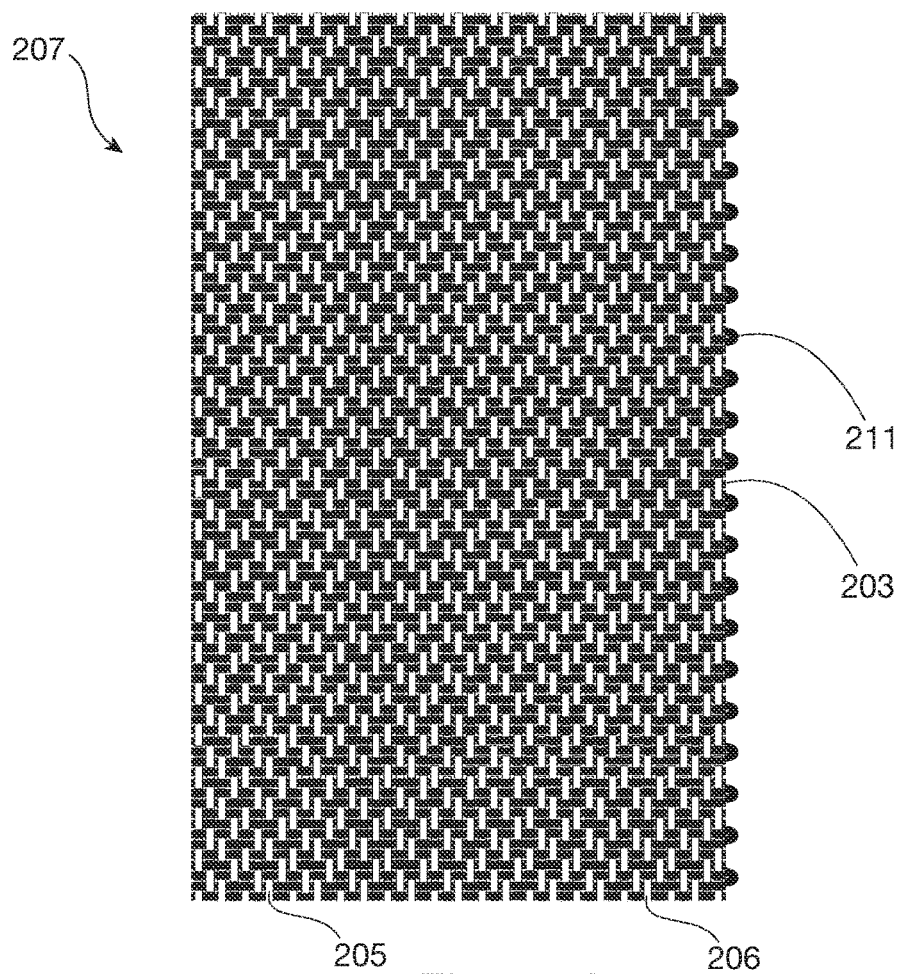
FIG. 3 is a strap body according to one embodiment of the invention, where the weft yarn and warp yarns are intertwined in a broken twill pattern.

A second embodiment of a strap body 207 is illustrated in FIG. 3.

The strap 201 (not illustrated) comprises the body 207 and an exterior coating 209 (also not illustrated). FIG. 3 illustrates the body 207 without the coating 209, to better illustrate the configuration of the body 207. A single continuous weft yarn 203 is wound around a plurality of elongate warp yarns 205. For the avoidance of doubt, the dark yarn in both of FIGS. 3 and 3A represent the continuous weft yarn 203.

Figure 3A:
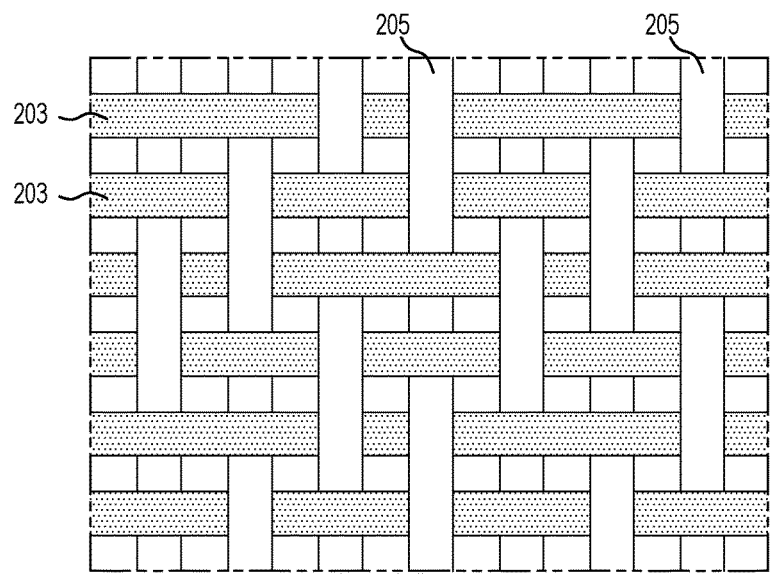
FIG. 3A is a schematic diagram of a broken twill pattern, illustrating the layout of warp and weft yarns within the pattern.

The winding sequence used is a form of broken "twill" pattern, as illustrated schematically in FIG. 3A. The broken twill pattern is formed by floating the continuous weft yarn 203 over multiple warp yarns 205, and then under multiple warp yarns 205 (illustrated here in steps of two warp yarns at a time). The subsequent winding sequence then reverts back to a plain pattern (one over and one under, hence "broken"). And the third shot of the weft yarn 203 then reverts to the two over, two under floating pattern but shifted across the body 7 by one warp yarn 205. This winding sequence produces a progressive pattern that forms a distinct diagonal line in the body of the strap 207.

Each warp yarn 205 may be formed of a bundle of between 500 and 5000 individual fibres or filaments 206. In one embodiment of the strap 201, each warp yarn comprises 4000 fibres 206. The fibres 206 are straight and not twisted within the warp yarns 205, such that pulling on the individual fibres 206 would allow them to slide out from the weft 203. Accordingly, the fibres 206 are substantially straight within a casing formed of the weft yarn 203 and they are they not crimped or bent within the body 207.

The body 207 of FIG. 3 can be made from a variety of different material combinations. An example of one such material combination uses the following specifications:
Weft yarn: 1 End (500 fibres)
550×1 D/tex Twaron™ (or High tenacity polyester)
Warp yarns: 24 Ends (or 26 Ends of 4000 fibres)
6640×1 D/tex Twaron™
Locking thread: 1 End
550 D/tex Twaron™ (or polyester or Polyethylene terephthalatate (PET))

Twaron™ is a product name for a para-aramid product made by Teijin. Twaron™ has a unique combination of mechanical properties, in that is exhibits chemical resistance, good durability and also thermal stability. These properties coupled with high strength and low elongation properties may provide the strap 1 with desirable characteristics. The individual warp yarns 205 of the strap 201 can comprise between 500 to 5000 individual fibres. In some embodiments the warp yarns 205 each contain a bundle of 4000 individual fibres of Twaron™.

Technora™ is also a product by Teijin and is an aramid closely related to DuPont's product Kevlar™. Standard aramids are made from p-phenylene terephthalamides and as such, are often referred to as PPTAs. However, Technora™ is produced by condensation polymnerization of terephthaloyl chloride with p-phenylenediamine and diaminodiphenylether.

Technora™ is a lower density fibre that that of Kelvar™ and may provide weight savings in the finished strap 201 over a conventional para-aramid fibre. It has a high tensile modulus in addition to low creep and low stress relaxation properties. Forming the strap 207 from Technora™ may provide improved dimensional stability and reduced thermal shrinkage.

Technora™ also exhibits high corrosion resistance on exposure to acids, alkalis, organic solvents, and saltwater. And advantageously, the strength of Technora™ fibres are virtually the same dry as they are wet, meaning that the strap 207 performance may offer improved comparable performance in heavy rain conditions as that of dry conditions.

The individual warp yarns 205 of the strap 201 can comprise between 100 to 500 individual fibres of Technora™. In some embodiment the yarns 205 each contain a bundle of 150 fibres of Technora™.

Third Embodiment

Figure 4:
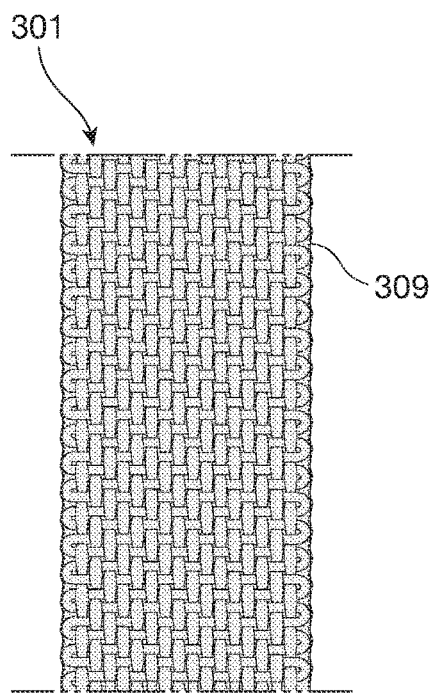
FIG. 4, is a strap according to one embodiment of the invention, illustrating an outer plasticised later.

A third embodiment of the strap 301 is illustrated in FIG. 4.

Figure 4A:
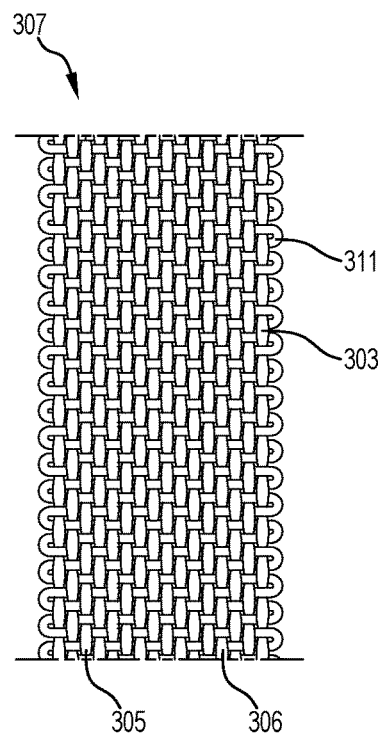
FIG. 4A is a strap body of the strap of FIG. 4, illustrating the weft yarn and warp yarns intertwined in a straight twill pattern.

The strap 301 comprises a body 307 and an exterior coating 309. FIG. 4A shows the body 307 without the coating 309, to better illustrate the configuration of the body 307. A single continuous weft yarn 303 is wound around a plurality of elongate warp yarns 305.

Figure 4B:
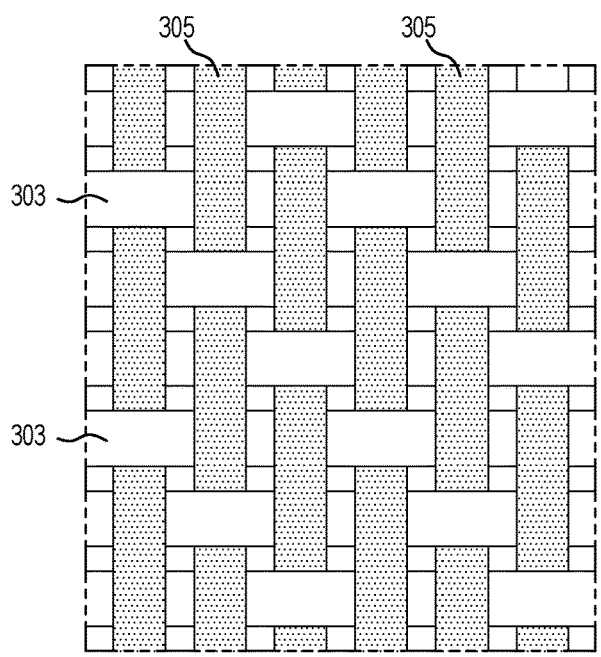
FIG. 4B is a schematic diagram of a sateen pattern, illustrating the layout of warp and weft yarns within the pattern.

The winding sequence used is a form of "straight twill" pattern, as illustrated schematically in FIG. 4B. This pattern is also referred to as a "2-by-1" twill. The straight twill pattern is formed by floating the continuous weft yarn 303 over multiple warp yarns 305, and then under a single warp yarn 305 (illustrated here in floats of two warps followed by one warp). Each subsequent winding sequence follows the same floating pattern but is shifted over by one warp yarn 305. The length of the long floats gives the body 307 a smooth, soft feel and creates a visual sheen on the body 307.

This straight twill pattern may provide the strap 301 with an increased flexibility over a plain pattern. This flexibility may be increased by increasing the number of warp yarns 305 over which the weft 303 is floated. However, floating the weft 303 over more than four warp yarns 305 can produce an overly loose body 307 which may make handling of the body 307 awkward.

Each warp yarn 305 may be formed of a bundle of between 30 and 500 individual fibres 306. Preferably the fibres 306 are straight and not twisted within the warp yarns 305, such that pulling on the individual fibres 306 would allow them to slide out from the weft 303. Accordingly, the fibres 306 are substantially straight within a casing formed of the weft yarn 303 and they are they not crimped or bent within the body 307.

In some embodiments, the fibres 306 of the warp yarns 305 can be loosely twisted along the length of the warp yarn. In these embodiments, each fibre 306 has a helical configuration with a very long pitch. In some embodiments the pitch may be over a metre or longer. In some embodiments there may be between 50-100 twists per metre. This twisting of the fibres 306 may provide improvements in the strength of the finished strap 301 but can also create manufacturing difficulties in forming the body 307.

The body 307 of FIG. 4 can be made from a variety of different material combinations. An example of one such material combination uses the following specifications:
Weft yarn: 1 End
550 D/tex polyester
Warp yarns: 24 Ends (4000 fibres)
6640 D/tex Twaron™
Locking thread: 1 End
550 D/tex Twaron™

Fourth Embodiment

Figure 5:
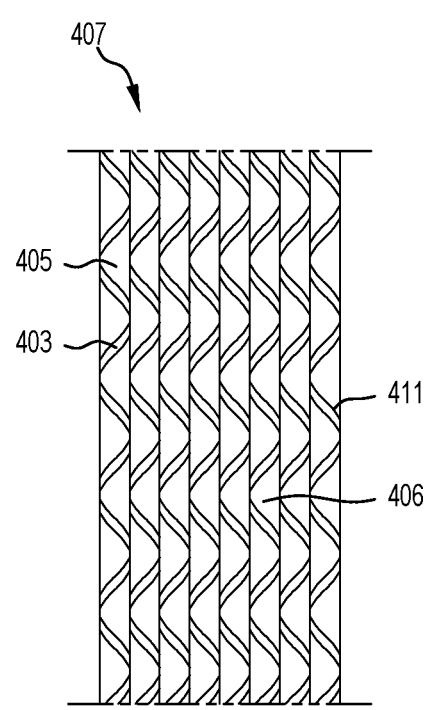
FIG. 5 is a strap body according to one embodiment of the invention, where the weft yarn and warp yarns are intertwined in a knitted pattern.

A fourth embodiment of the strap 401 is illustrated in FIG. 5.

The strap 401 (not illustrated) comprises a body 407 having an outer coating 409. FIG. 5 shows the body 407 without the coating 409, to better illustrate the configuration of the body 407. A continuous weft yarn 403 is wound around a plurality of elongate warp yarns 405

The winding sequence used is a form of knitted pattern. The knitted pattern forms a recognisable V-shaped pattern on the technical (front) face of the strap 401. This pattern is formed by interleaving a plurality of weft yarns 403 around the plurality of warp yarns 405 and intertwining the weft yarns 403 with one another.

Each warp yarn 405 may be formed into a bundle of between 500 and 5000 individual fibres or filaments 406. In some embodiments of strap 401, the fibres 406 within each warp yarn 405 are substantially aligned. In some embodiments of strap 401, the fibres 406 within each warp yarn 405 are twisted around each other. In some embodiments, the fibres 406 of the warp yarns 405 can be loosely twisted along the length of the warp yarn 605. In these embodiments, each fibre 406 has a helical configuration with a very long pitch. In some embodiments the pitch may be over a metre or longer. In some embodiments there may be between 50-100 twists per metre. In one embodiment there are about 60 twists per metre.

The body 407 of FIG. 5 can be made from a variety of different material combinations. An example of one such material combination uses the following specifications:
Weft yarns: 22 Ends
300550×1 D/tex polyester
Warp yarns: 10 Ends
6440×1 D/tex Twaron™

Method of Manufacturing a Strap

In a further aspect, the invention provides a method of manufacturing a strap 1 for tensioning a vehicle side curtain 10, the method comprising the steps of:
(a) interleaving a weft yarn 3 with a plurality of warp yarns 5 to form a strap body 7;
(b) bringing the warp yarns 5 into a substantially straight configuration; and
(c) using a coating 9 to retain the warp yarns 5 in their substantially straight configuration.

The strap body 7 is manufactured on a loom, where by the weft yarn 3 is continuously interleaved with the plurality of warp yarns 5 as they are drawn off large spools. The strap body 7 is loosely held together as the weft yarn 3 retains the plurality of warp yarns 5 adjacent to one another.

As the strap body 7 is drawn-off the loom it can be wound onto large spools in preparation for coating. The spools of finished strap body 7 are then taken to a manufacturing station to be coated and set.

The strap body 7 is unspooled under tension, to drawn the plurality of warp yarns 5 into alignment with one another and to straighten the warp yarns 5 before being introduced to the settable material 9.

The settable material 9 may be a compound of uncured thermoplastic paste. The paste can comprises plasticisers, plastics, thermoplastics and combinations thereof and may be stored in a bath as a molten compound through which the tensioned strap body 7 is passed. The settable material may be PVC. The bath of liquid paste can be maintained at room temperature or just above, for example 30-35° C.

Alternatively, the liquid compound of thermoplastic paste may be sprayed onto the tensioned strap body 7, either stationary or moving in or through a spray booth (not illustrated).

In one embodiment, the warp yarns 5 may be impregnated with a powered plasticised compound. The warp yarns 5 can be coated with the powdered plasticised compound prior to being interleaved with the weft yarn 3. For additional coverage of the coating, the weft yarn 3 can also be impregnated with a plasticised compound to increase the available material coating for setting and forming the exterior layer of the strap 1.

Once coated with the plasticised compound 9, the plasticiser or alternative settable material is set around the strap body 7 to form an exterior shell. The setting is performed by exposing the coated strap body 7 to heat at temperatures of between 200 and 240 degrees Celcius. The setting may be conducted in an oven. The duration of the setting process will be about a minute. Alternatively, the setting may be accelerated by exposing the coated strap body 7 to higher temperatures for a shorter duration.

In one embodiment of the invention, the coated, tensioned strap body 7 is passed over a heating element of approximately 1 metre in length. The tensioned strap body is passed over the heater at a rate of about 8 metres per minute, thus exposing the strap to heat for about 7-10 seconds at a temperature of 240° C.

In one embodiment the strap body 7 is drawn, still under tension, past a heat source. The heat source may be a heater or a pair of heated rollers, such that the plasticised compound 9 is set and thus form a sealed exterior coating 9 around the strap body 7 to bind the warp yarns 5 under tension into the finished strap 1.

The coating 9 may provide an additional layer of protection to the strap 1. The coating 9 may provide a waterproof layer of protection to the strap 1.

Alternatively, the coating 9 may provide a coloured coating to the exterior of the strap 1 to assist in identification of the predetermined characteristics of the strap 1.

The thermoplastic exterior coating 9 can be welded, stitched or otherwise adhered to itself or to other materials. This facilitates the forming of loops and end fixings for the strap 1 to enable it to be attached to a further strap 1, or a metal hoop or buckle to allow the strap 1 to be tightened and tensioned, in use. The thermoplastic coating provides additional friction when the strap 1 is stitched to itself. This may improve the strength of any loops or end fixing created from the strap 1.

The thermoplastic coating 9 of the strap 1 may also provide benefits in stabilising the structure of the strap body 7. Stabilising the strap body 7 may assist in spreading load across the finished strap 1 in a more even manner and induces cooperation between the individual warp yarns 5 of the strap body7.

The coating 9 further preserves the geometry of the warp yarns 5 and produces cooperation between the yarns so that when force is applied, the yarns are equally loaded. This creates a strap 1 where the sum of the strength of each warp yarn is almost equal to the strength of the strap as a whole, or where the sum of the strength of each warp yarn is approaching the strength of the strap as a whole.

Curtain Tensioned by Straps

In a further aspect, the invention provides a vehicle side curtain 10 for a vehicle 14, comprising: a sheet 12 for location adjacent a roof 23 of the vehicle 14, the sheet 12 having upper 13 and lower portions 14; and a plurality of straps 1 that extend between the upper 13 and lower portions 14 of the sheet 12, each of the straps 1 at least partially restrained to the sheet 12, at least one of the straps 1 comprising: a strap body 7 having a plurality of warp yarns 5 and a weft yarn 3, the weft yarn 3 being interleaved with each of the plurality of warp yarns 5, wherein the warp yarns 3 are in a substantially straight configuration; and a coating 9 to retain the warp yarns 5 in their substantially straight configuration.

Figure 6:
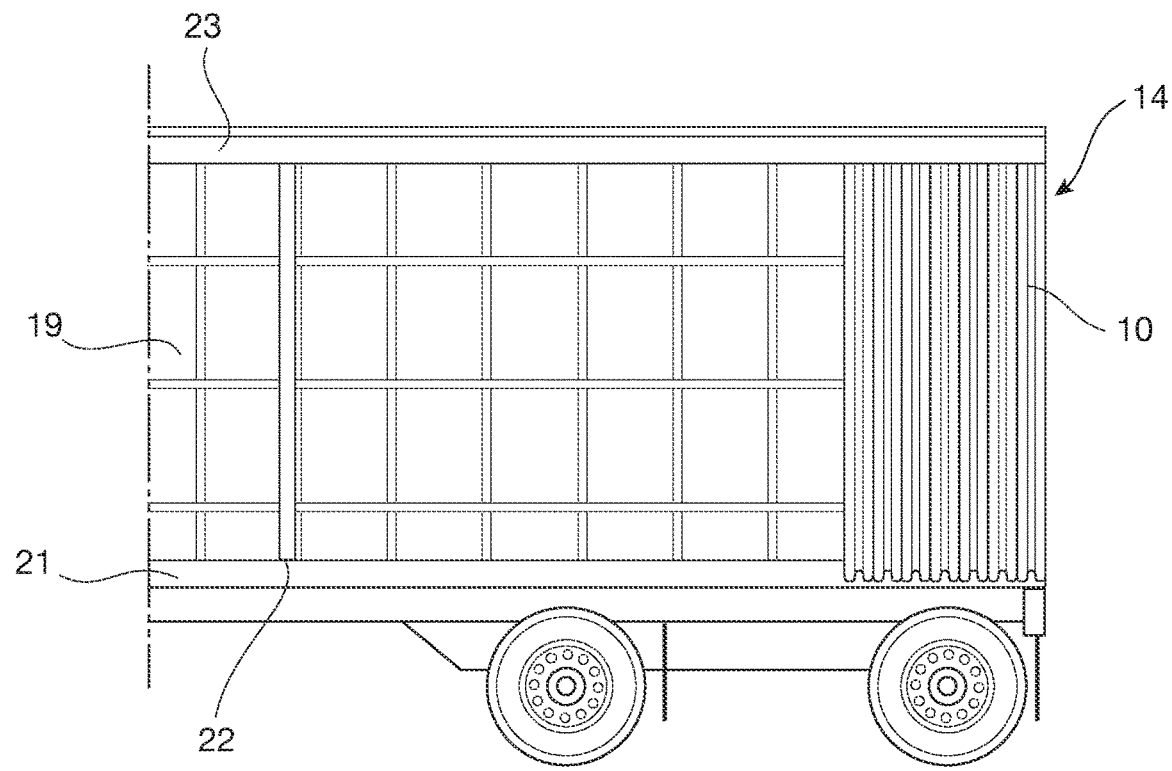
FIG. 6 is a photograph of a trailer illustrating an open loading bay and a folded side curtain.
Figure 7:
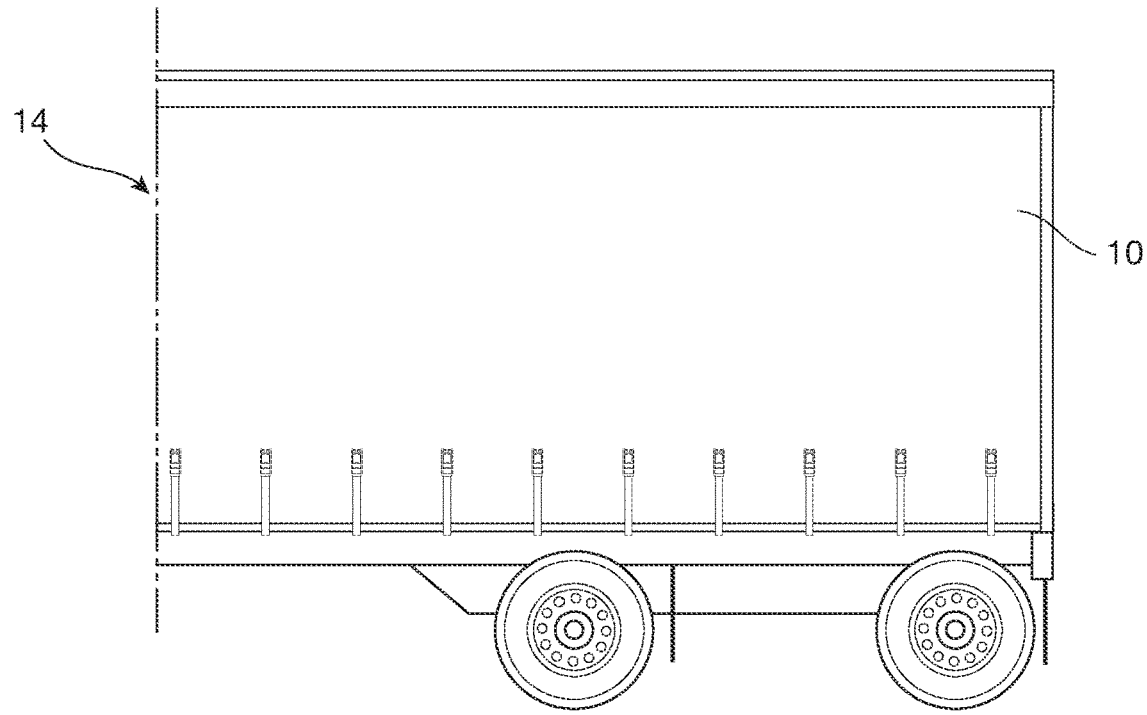
FIG. 7 is a photograph of the trailer of FIG. 6, with the curtain unfolded and tensioned to close the loading bay.
Figure 8:
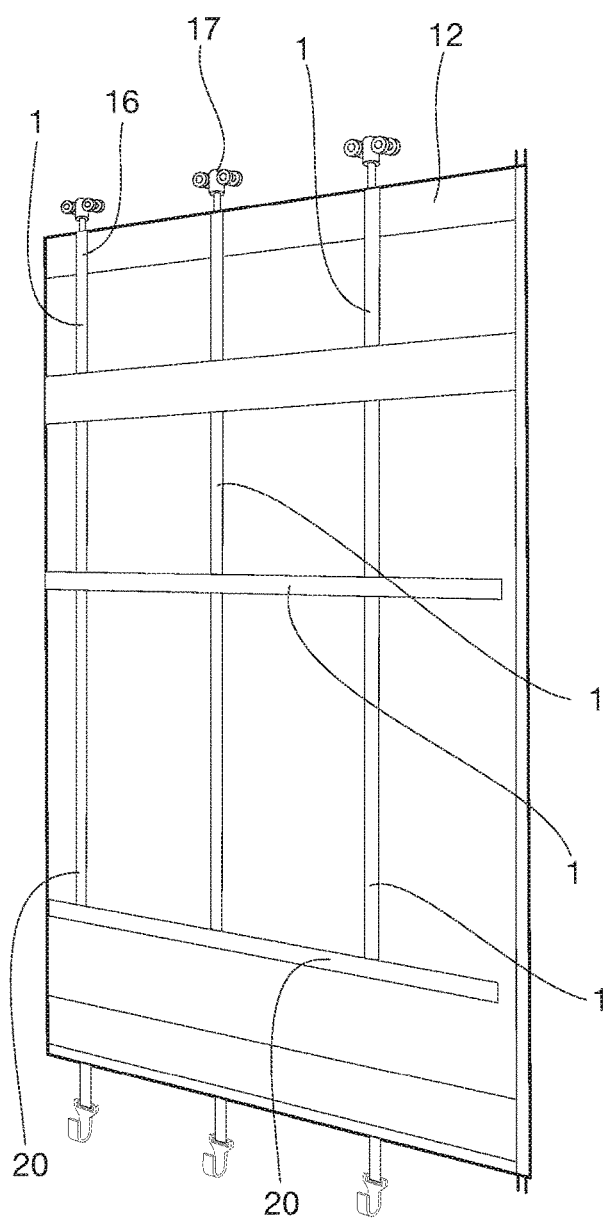
FIG. 8 is a perspective view of an inner face of the curtain of FIG. 6, illustrating an orthogonal application of a series of tensioning straps to the curtain.
Figure 9:
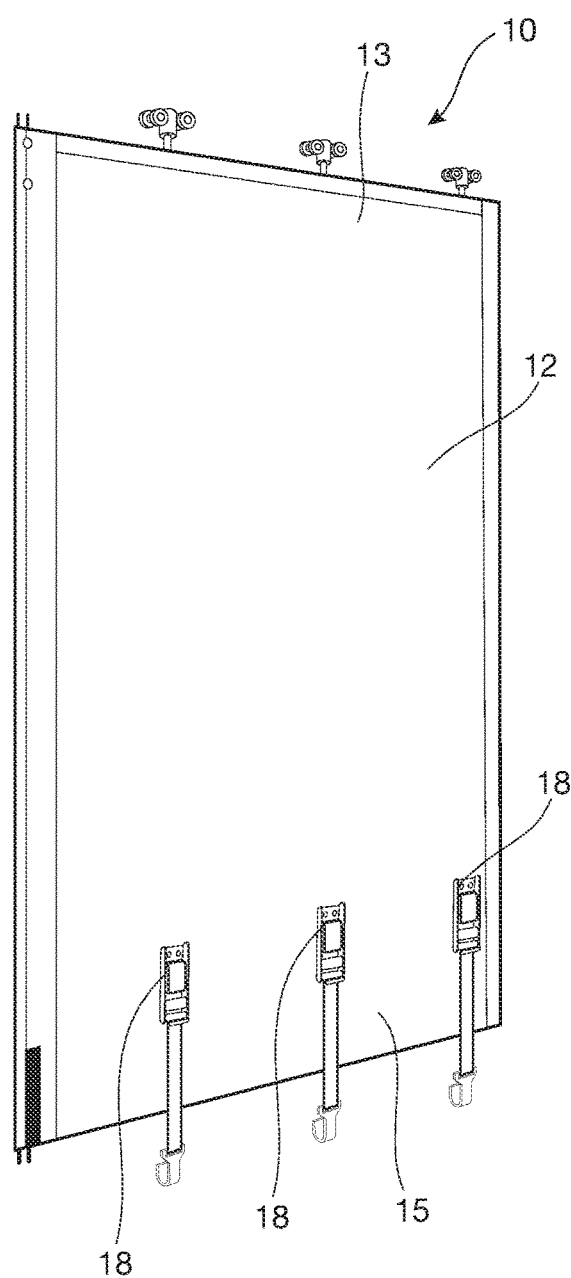
FIG. 9 is a perspective view of an outer face of the curtain of FIG. 6, illustrating a mechanism for tensioning the curtain when attached to a trailer.

FIGS. 8 and 9 illustrate a vehicle side curtain 10 according to one embodiment of the present invention, which may be used to seal an open loading bay of a trailer 14. See FIGS. 6 and 7 illustrating an example of an open loading bay 19 having the curtain 10 drawn, and closed loading bay 19 where the curtain 10 is drawn and tensioned across the open loading bay. The tensioning of the curtain 10 is achieved by buckling, or otherwise restraining, a lower portion of the curtain 10 to a coaming rail 21.

The term "coaming rail or coaming", as used herein is understood to refer to any kind of frame or border around the outside of a vehicle's loading deck.

The curtain 10 includes a sheet 12, which in use provides a weather resistant barrier between the load bay 19 and the elements. The sheet 12 has an upper edge 13 for location adjacent the roof of the trailer 14.

The curtain 10 also has a first set of straps 1 that extend between the upper edge 13 and the opposing lower edge 15 of the sheet, and are restrained to the sheet 12. Upper ends 16 of the straps 1 are secured to rollers 17, which may run in a track along the load bay roof of a trailer 14.

The curtain 10 further has tensioners 18 at the lower end 20 of each strap 1. The tensioners 18 engage with the coaming rail 21 on the load bed 22 of the trailer 14 to draw the curtain 10 tight across the load bay 19.

The curtain 10 further has a second set of straps 1' that extend transversely to the first set of straps 1 and are also restrained to the sheet 12. In this case, the second set of straps 1' extend in the lengthwise direction of the trailer 14. As can be seen in FIG. 8, the first and second sets of straps 1, 1' are generally orthogonal, and thus support tensile forces in generally orthogonal directions across the sheet 12.

In the embodiment shown in FIGS. 8 and 9, the sheet 12 is made of polyester reinforced polyvinyl chloride (PVC) and the straps 1, 1' have a PVC coating. The straps 1, 1' are restrained to the sheet 12 by plastic welding. In this embodiment, the plastic welding is along the entire length of the overlap between the sheet 12 and the straps 1, 1'. However, in some alternative embodiments, plastic welds may be formed at discrete, spaced apart locations where the sheet 12 overlaps with the straps 1, 1'.

Restraining the straps 1, 1' to the sheet 12 has the benefit of limiting separation of the straps 1, 1' as load is applied to the curtain 10. Furthermore, if the straps of at least the first set 1 are tensioned, the sheet 12 is less likely to flap when the trailer 14 travels at speed.

As will be appreciated, the number of straps in each the first and second sets of straps 1, 1' can be selected to suit the particular application.

National standards for the strength of side curtains are measured by means of the allowable deviation of the curtain over its length when a load is applied of 0.5 g sideways. The present standard (Load restraint guide page 168) prescribes that a load must be restrained to prevent an unacceptable amount of movement.

The use of the above-described vehicle side curtain 10 may provide a load restraint system because the warp yarns 5 within the straps 1, 1' resist elongation of the straps 1, 1' in response to tensile forces. When a load shifts on the load bed 22 of the trailer 14, and bears against the curtain 10, the straps 1, 1' resist the stretch of the curtain 10, which may reduce the extent to which the load will protrude beyond the side of the trailer 14.

Fifth Embodiment

Figure 10:
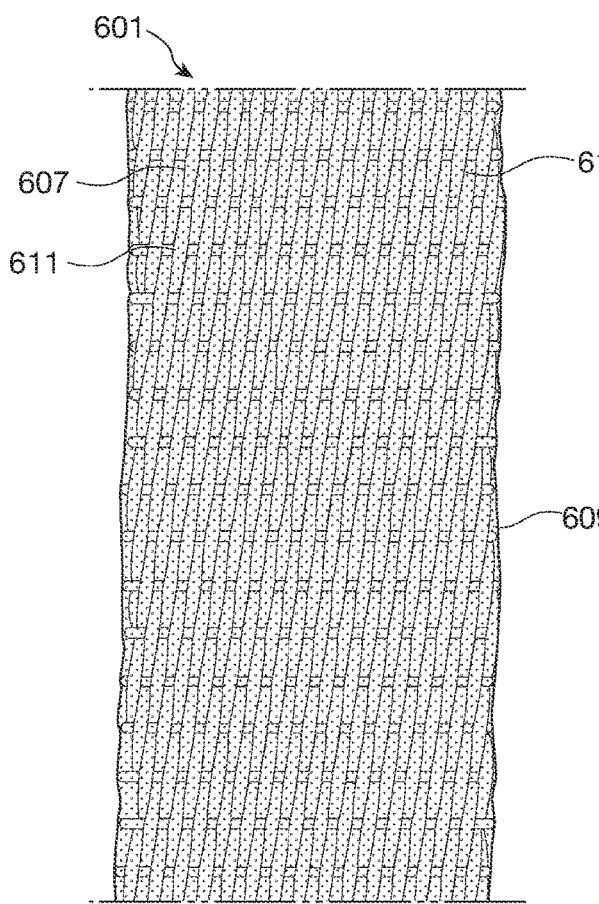
FIG. 10 is a strap according to one embodiment of the invention, illustrating an outer plasticised layer.
Figure 10A:
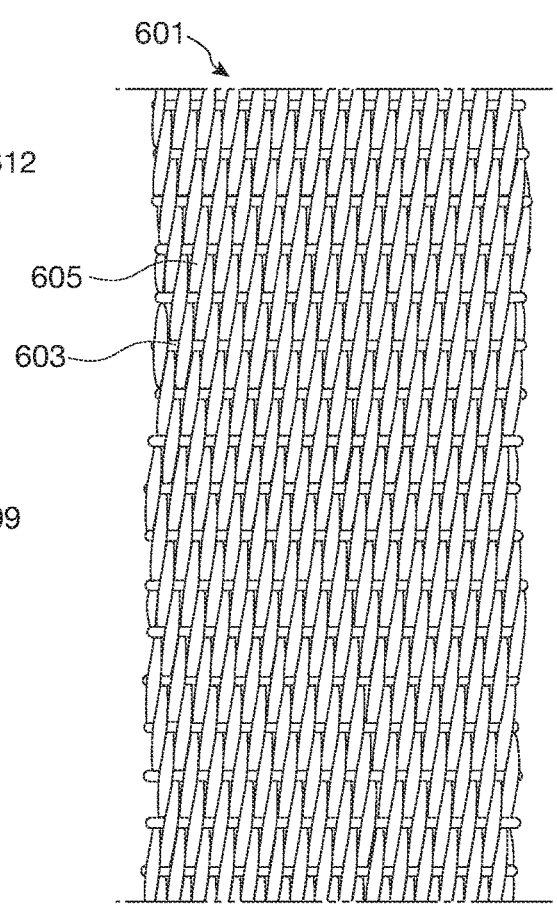
FIG. 10A is a strap body of the strap of FIG. 10, illustrating the weft yarn and warp yarns intertwined in a modified twill pattern.
Figure 10B:
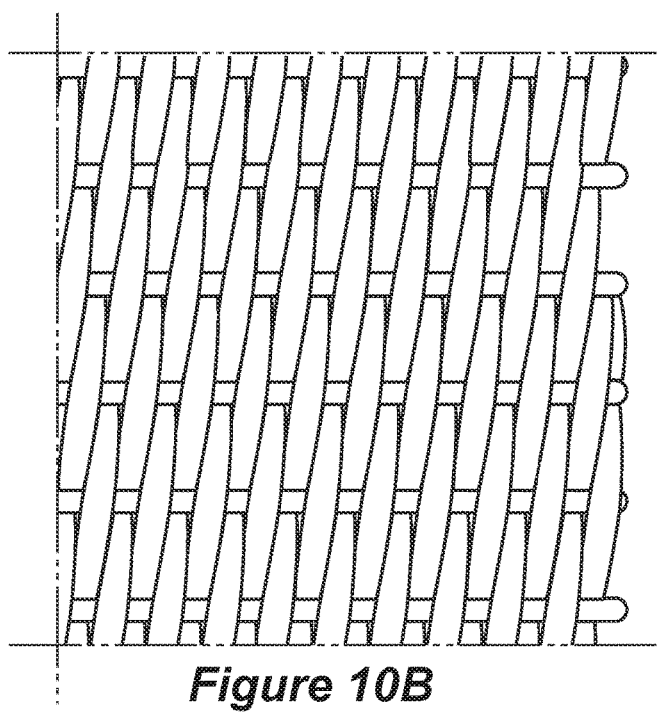
FIG. 10B is an enlarged view of an edge of the strap body from FIG. 10A, illustrating a double pick of the weft yarn and a plurality of fibres in the warp yarns.

A fifth embodiment of the strap 601 is illustrated in FIGS. 10 and 10A.

The finished strap 601 will comprise a strap body 607 and an exterior coating 609, illustrated in FIG. 10.

The materials used in this fifth embodiment are the same as those described above in relation to other embodiments of the invention (an example is provided below defining a possible combination of materials and their respective linear mass densities). The body 607 is tensioned before coating to straighten and align the warp yarns 605, such that the thickness of the finished strap 601 is about 1.7 mm. This provides a unidirectional strap 601 with a flat profile; and substantially smooth outer surfaces. The winding sequence of weft and warp yarns used in the strap body 607 of this fifth embodiment is a form of modified "twill" pattern described below. This provides a heavy duty strap for use in heavy duty applications, as compared to the lighter weight straps defined in other embodiments of the invention.

The strap 601 comprises a body 607 and an exterior coating 609. FIG. 10A shows the body 607 without the coating 609, to better illustrate the configuration of the body 607. The warp yarns 605 (extending longitudinally down the strap in FIG. 10A) are not tensioned in FIG. 10A and as such the body 607 has a thickness of about 1.9 mm. A single weft yarn 603 (looping back and forth across the strap in FIG. 10A) is wound around a plurality of elongated warp yarns 605 (specifically, wound around 60 warp yarns in this embodiment). FIG. 10A illustrates the weft 603 having a double pick, as this strap body 607 is formed on a four heddle, needle loom (not illustrated).

FIG. 10B is an enlarged view of an outer edge of the strap body 607 from FIG. 10A. The double pick of the weft 603 is shown as weft strand 603a and weft strand 603b. The weft 603 makes a single pass of the warp yarns 605 and is captured at the end of the pick by the locking yarn 612. The weft then travels back across the warp yarns 605 to complete the double pick before the heddles of the loom are adjusted.

Figure 11:
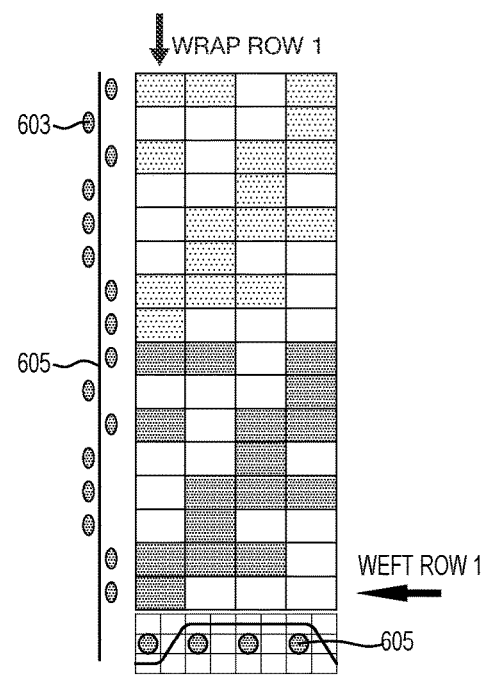
FIG. 11 is a point paper diagram and schematic representation of a modified twill using an eight shaft or 8 heddle loom.

FIG. 11 illustrates a point paper diagram and two schematic views of this modified twill pattern from the point paper. The schematic view below the point paper is a representation of "Weft Row 1" indicated by a horizontal arrow, where red warp threads 605 as shown as circular dots and a blue weft thread 603 follows the point paper design of Weft Row 1 over and under the warps. The physical winding of the weft around the four straight warp yarns is a 1 up, 3 down pattern ie. 1 warp yarn on the top of the strap and 3 warp yarns on the bottom face of the strap.

The schematic to the left of the point paper design is a representation of "Warp Row 1" indicated by a vertical arrow and illustrates the position of the weft yarn 603 as it passes either side of the straight warp yarn 605 on each subsequent pick.

The pattern illustrated in FIG. 11 is formed across 4 heddles (which is represented by the four squares across the point paper). The pattern can then be repeated to produce the desired width and length of strap body. The pattern of FIG. 11 is shown to repeat along the warp yarns every eight passes of the weft, for reference purposes only a first cycle of the pattern is illustrated in blue, and a repeated cycle of the pattern in illustrated in red.

The modified twill pattern of FIG. 11 is applied to this fifth embodiment of the strap 601. The weaving draft used to form strap body 607 of FIG. 10A is provided in FIG. 14. The point paper design is for a loom having 4 heddles or shafts (represented by the four columns of the point paper illustrated in FIG. 14(a). This modified twill pattern is formed by feeding the weft yarn 603 under a first warp yarn 605 (to bring the warp to the top of the weave), then floating the weft yarn 603 over one, two or three subsequent warp yarns 605. Each subsequent warp row of the pattern shifts the 3 up, 3 down, 1 up, 1 down pattern by two weft rows.

Alternate twill patterns can be created using floats of 2 up, 2 down; 4 up 4 down; and 5 up 5 down. However, if the twill is further modified to float over more than 3 warps at a time, the strap body 607 becomes increasingly loose, which can make the handling of the strap body more cumbersome when introducing strap body into the binding/coating process. The lengthened floats of body 607 provide an opportunity to capture significantly more warp yarns 605 than the earlier described embodiments of the invention using a plain weave, for a given length of the strap. The strap body 607 is approximately 49 mm in width and captures 60 warp ends.

This fifth embodiment is a heavy duty strap 601 and is to be contrasted with the first embodiment of the invention using a plain pattern in which only 24 ends of warp yarn were incorporated across the 49 mm width of the strap 1. The lighter first embodiment of the strap 1 has many applications; however, it is limited in the number of warp yarns 5 that can be physically incorporated into the strap body 7. If an increased number of warp yarns 5 are forced into the plain pattern of strap body 7, there is a risk that the warp yarns 6 will start to deflect and no longer remain straight within the strap body 7. The modified twill of this fifth embodiment does not deflect the warp yarns and provides for an increase from 24 to 60 ends, as the weft floats over as many as three warp yarns in a pick.

Each warp yarn 605 may be formed of a bundle of between 30 and 500 individual fibres, illustrated in FIG. 10B. In some embodiments these fibres are straight and not twisted within the warp yarns 605, such that pulling on the individual fibres would allow them to slide out from the weft 603. Accordingly, these fibres are substantially straight within a casing formed of the weft yarns 603 and they are they not crimped or bent within the body 607.

In some embodiments, the fibres 606 of the warp yarns 605 can be loosely twisted along the length of the warp yarn 605. In these embodiments, each fibre 606 has a helical configuration with a very long pitch. In some embodiments the pitch may be over a metre or longer. In some embodiments there may be between 50-100 twists per metre. In one embodiment there are about 60 twists per metre. The twist can be a "Z-twist" aka clockwise twisting of the fibres along the yarn. The twist can be an "S-twist" aka counter-clockwise twisting of the fibres along the yarn. This twisting of the fibres 606 may provide improvements in the strength of the finished strap 601.

Locking threads or catch threads 611 and 612 run down the sides of the strap body 607. Locking threads 611 and 612 assist in maintaining the geometric form and dimensions of the finished strap 601. The locking threads also assist in holding the edges together and keeping them flatter. The locking threads capture the weft 603 at the ends of each row, as the weft has a double pick for forming strap 601 on a needle loom.

An example of the heavy duty strap 601 was measured under load to achieve a breaking load of about 6500-7000 Kg. In comparison, an example of the plain, lightweight strap 1 of the first embodiment was tested and achieved a breaking load of about 2500 Kg. There is benefit to providing both heavy duty and lightweight versions of the strap of the invention, as different straps can be used for different applications and different load requirements.

The strap body 607 provides a higher number of warp yarns 605 to the single weft yarn 603 which effectively increases the strength of the finished strap 601 without creating deflection in the warp yarns 605.

The number of picks in a strap body determines the number of passes the weft has to make for each cm of strap formed. As the number of picks in the body 607 is about 3 picks per cm, the strap body 607 is a relatively fast product to form. As the number of passes the weft yarn 603 makes per cm of strap body 607 decreases (ie. the number of picks decreases) the speed of forming the strap body 607 increases. A plain weave strap having as few as 3 picks per cm would typically form a very loose strap body; however, the increased number of warp yarns 605 entwined within the weft 603 of the twill strap body 607 provides a strap body 607 that can be handled without significant loss of stability and then fed into a secondary processing station to be tensioned and receive a coating and setting treatment to form the finished strap 601.

Figure 12:
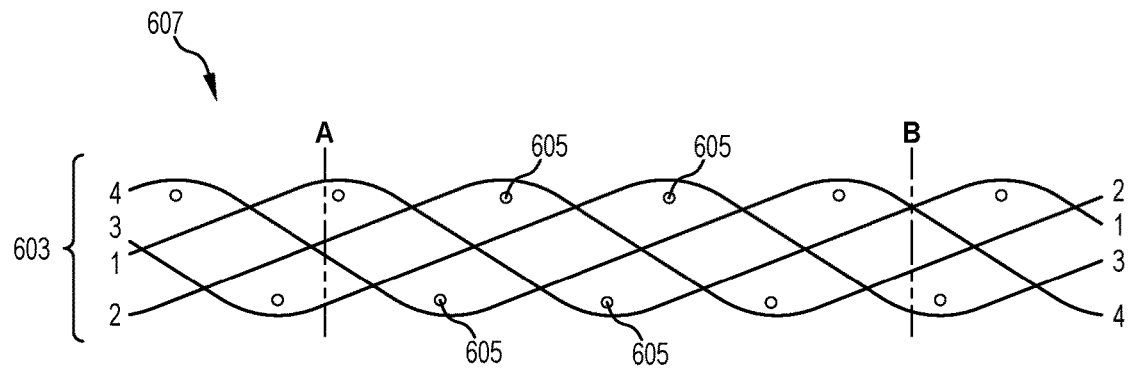
FIG. 12 is a cross-sectional schematic view of the strap body according to FIG. 10A, illustrating four consecutive picks/passes of the weft yarn in an exploded view, being intertwined with a plurality of straight warp yarns in a modified twill pattern.

FIG. 12 is a schematic view of strap body 607 in cross-section. It greatly exaggerates the through thickness depth of the strap body 607 to better show the lay-up of yarns through the thickness of the body 607. The schematic view of FIG. 12 illustrates the straight warp yarns 605 as dots as the illustration is a cross-section through a longitudinal axis of the strap body 607. The bars A and B on opposing sides of the illustration represent one cycle of the repeating modified twill pattern.

Figure 13:
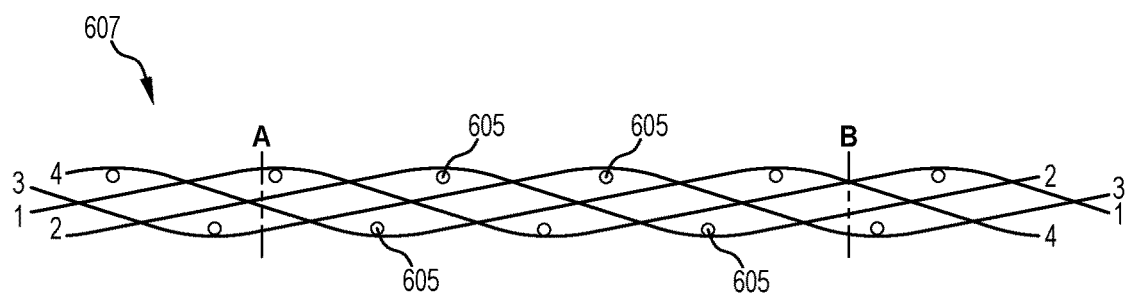
FIG. 13 is a cross-sectional schematic view of the strap body of FIG. 10A illustrating how the straight warp yarns are nested within the weft yarns when the strap is flattened.

FIG. 13 illustrates the nesting or lay-up of the warp yarns 605 in the finished body 607 and shows how this embodiment of the strap can provide a thicker, heavier duty strap with an increased strength per unit length than that of previously described embodiments which are ideally suited to lighter weight applications. The increase in strength is partially due to the increased number of warp yarns 605 entwined by the weft 603: from 24 to 60. FIG. 13 is a less exaggerated representation of the weft and warp yarns within the strap body 607. The straight warp yarns are represented by dots, and four subsequent passes of the weft yarn ((1)-(4)) are flattened in the strap body where the warp yarns 605 become encased therein.

The earlier described embodiments, such as the plain strap 1 are limited by the number of warp yarns 5 that will physical fit within the weft yarn 3 present. The modified twill pattern of this embodiment provides for eight warp yarns 605 to be entwined within the four picks of weft yarn 603 to form one full pattern cycle (see between lines A-B of FIGS. 12 and 13). The embodiment illustrated in FIG. 10 still has insufficient strength in the weft yarn 603 to deflect the warp yarns 605, thus the warp yarns 605 maintain their ideal, straight configuration within the strap body 607. To attempt to insert this many additional warp yarns 5 into the plain pattern of strap 1 could risk deviation of the warp yarn 6. Effectively, this modified twill pattern allows the capture of every fourth warp yarn 605 with each double pick of the weft yarn, as compared to the plain weave that captures every one.

It is contemplated that the weave of this embodiment could be further amended to incorporate more warp yarns 605 for example in excess of 60 warp yarns across a 49 mm width of strap. This could further increase the strength of the finished strap body 607. Effectively the additional warp yarns 605 captured within the strap body 607 act as stuffer strands to increase the strength of the finished strap.

Example 1

The body 607 of FIG. 10A can be made from a variety of different material combinations. An example of one such material combination uses the following specifications:

Weft yarn: 1 End (Double pick)
 550 D/tex Twaron™
Warp yarns: 60 Ends (4000 fibres)
 6640 D/tex Twaron™
Locking thread: 2 End
 550 D/tex Twaron™

The Draft for the Fifth Embodiment

Figure 14:
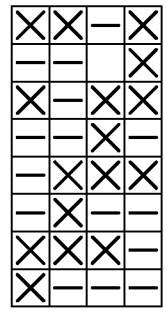
FIG. 14 is a weaving draft for the strap body of FIG. 10A, showing (a) a point paper design; (b) a drawing plan (or threading plan); and (c) a lifting plan for a four heddle loom.
Figure 14:
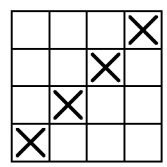
Figure 14:
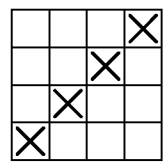

The draft or map for forming the body 607 of FIG. 10A, the fifth embodiment of the strap, is illustrated in FIG. 14. The draft comprises three elements: (a) a point paper design; (b) a drawing (or threading) plan; and (c) a lifting (or treadling) plan illustrating the pattern for lifting each of the four needle-loom heddles to form the design.

The point paper design of FIG. 14(a) illustrates a grid, where the horizontal spaces represent weft yarns and the vertical spaces warp yarns. Accordingly, each square on the point paper is an intersection point between a warp and a weft yarns, where an "X" marks an intersections where the warp yarn is on top of the pattern and "-" marks an intersection where the warp yarn is below the weft. The four boxes across the width of the point paper design represent the four heddles or shafts of the loom. Each pick of the weft is sequentially passed under a warp yarn and then floated over the next one/two/three warp yarns trapping the straight warp yarns therebetween. The pattern is repeated across the desired width of the strap body 607 to incorporate 60 ends of warp yarn into the 49 mm width of the strap body 607.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A weldable strap for tensioning a vehicle side curtain, the strap comprising:
   a strap body having a plurality of warp yarns and a weft yarn, the plurality of warp yarns are arranged in longitudinal alignment to one another and oriented in a primary working direction of the strap, the weft yarn being interleaved with each of the plurality of warp yarns, wherein the warp yarns are tensioned in a substantially straight configuration, the diameter and strength of each warp yarn is substantially greater than the diameter and strength of the weft yarn and a linear mass density of the plurality of warp yarns is greater than a linear mass density of the weft yarn, further wherein each warp yarn comprises between 500-8000 individual fibres and has a linear mass density of between 4000 to 15000 Decitex; and
   a coating to retain the warp yarns in their straight and tensioned configuration wherein the coating is a set material that has impregnated the warp yarns and binds each intersection between the weft yarn and the warp yarns together within the body of the strap, wherein the material sets at a temperature of more than 200° C.,
   wherein the strap has a maximum elongation at break of less than 5%.

2. The strap according to claim 1, wherein the material sets at a temperature of more than 240° C.

3. The strap according to claim 1, wherein each warp yarn has a maximum elongation at break of less than 3.5%.

4. The strap according to claim 1, wherein each warp yarn has a maximum elongation at break of less than 3%.

5. The strap according to claim 1, wherein the warp yarns are made of any one of the following materials: aramid fibres, para-aramid fibres, carbon fibres, and basalt fibres.

6. The strap according to claim 1, wherein the settable material comprises polyvinyl chloride.

7. A vehicle side curtain for a vehicle, comprising:
   a sheet for location adjacent a roof of the vehicle, the sheet having upper and lower portions; and a plurality of straps according to claim 1 that extend between the upper and lower portions of the sheet, each of the plurality of straps at least partially restrained to the sheet by welding.

8. A strap for tensioning a vehicle side curtain, the strap comprising:
   a strap body having a plurality of warp yarns and a weft yarn, the plurality of warp yarns being arranged in longitudinal alignment with one another and being oriented in a primary working direction of the strap, the weft yarn being interleaved with each of the plurality of warp yarns; and
   a coating that binds the weft yarn and the warp yarns together within the body of the strap,
   wherein a linear mass density of the plurality of warp yarns is greater than a linear mass density of the weft yarn, such that the warp yarns are retained within the strap in a substantially uncrimped configuration,
   wherein the diameter and strength of each warp yarn is substantially greater than the diameter and strength of the weft yarn,
   wherein each warp yarn comprises between 500-8000 individual fibres and has a linear mass density of between 4000 to 15000 Decitex, and
   wherein the strap has a maximum elongation at break of less than 5%.

* * * * *